United States Patent
Ogata

(10) Patent No.: US 10,925,339 B2
(45) Date of Patent: Feb. 23, 2021

(54) CLOTH AND FIBROUS PRODUCT

(71) Applicant: TEIJIN FRONTIER CO., LTD., Osaka (JP)

(72) Inventor: Nobuaki Ogata, Osaka (JP)

(73) Assignee: TEIJIN FRONTIER CO., LTD., Osaka (JP)

( * ) Notice: Subject to any disclaimer, the term of this patent is extended or adjusted under 35 U.S.C. 154(b) by 460 days.

(21) Appl. No.: 15/580,361

(22) PCT Filed: Jul. 5, 2016

(86) PCT No.: PCT/JP2016/069869
§ 371 (c)(1),
(2) Date: Dec. 7, 2017

(87) PCT Pub. No.: WO2017/038239
PCT Pub. Date: Mar. 9, 2017

(65) Prior Publication Data
US 2018/0142384 A1   May 24, 2018

(30) Foreign Application Priority Data

Aug. 31, 2015   (JP) .............................. JP2015-171132

(51) Int. Cl.
*D04B 1/20*    (2006.01)
*D01D 5/32*    (2006.01)
*D02G 3/04*    (2006.01)
*D01F 8/14*    (2006.01)
*D01F 8/12*    (2006.01)
(Continued)

(52) U.S. Cl.
CPC ......... *A41D 31/00* (2013.01); *A41D 31/0005* (2013.01); *A41D 31/14* (2019.02); *A47G 9/02* (2013.01); *A47G 9/0238* (2013.01); *B60N 2/58* (2013.01); *B60N 2/5891* (2013.01); *D01D 5/32* (2013.01); *D02G 3/04* (2013.01);
(Continued)

(58) Field of Classification Search
CPC ....................................................... D04B 1/20
See application file for complete search history.

(56) References Cited

U.S. PATENT DOCUMENTS 7,842,628 B2 * 11/2010 Yasui ..................... A41B 17/00
442/197
2008/0085398 A1   4/2008 Yasui et al.
(Continued)

FOREIGN PATENT DOCUMENTS

CN   101031679 A   9/2007
CN   103052742 A   4/2013
(Continued)

OTHER PUBLICATIONS

JP 2006-118062 A (English Translation). May 11, 2006 (Year: 2006).*
(Continued)

*Primary Examiner* — Jenna L Johnson
(74) *Attorney, Agent, or Firm* — Sughrue Mion, PLLC

(57) ABSTRACT

An object is to provide a cloth having excellent air permeability changing function due to wetness and dimensional stability and a fibrous product, and means for achieving the object is to obtain a cloth using a conjugate fiber having two components conjugated side by side and a crimped fiber having a torque of 30 T/m or less.

14 Claims, 2 Drawing Sheets

(51) Int. Cl.
*A41D 31/14* (2019.01)
*A41D 31/00* (2019.01)
*B60N 2/58* (2006.01)
*A47G 9/02* (2006.01)

(52) U.S. Cl.
CPC .......... *D04B 1/20* (2013.01); *D01F 8/12* (2013.01); *D01F 8/14* (2013.01); *D10B 2401/02* (2013.01)

(56) References Cited

U.S. PATENT DOCUMENTS

| | | | | |
|---|---|---|---|---|
| 2008/0132133 | A1* | 6/2008 | Yasui | A41B 17/00 442/200 |
| 2013/0122271 | A1* | 5/2013 | Yasui | D04B 1/16 428/219 |

FOREIGN PATENT DOCUMENTS

| | | |
|---|---|---|
| EP | 1803844 A1 | 7/2007 |
| EP | 2037026 A1 | 3/2009 |
| JP | 2004-339654 A | 12/2004 |
| JP | 2005036374 A | 2/2005 |
| JP | 2006-097147 A | 4/2006 |
| JP | 2006118062 A | 5/2006 |
| JP | 2007-119938 A | 5/2007 |
| JP | 2008-156762 A | 7/2008 |
| JP | 2010059570 A | 3/2010 |
| JP | 2010-180517 A | 8/2010 |
| JP | 2012087427 A | 5/2012 |
| WO | 9716587 A1 | 5/1997 |
| WO | 02/084002 A1 | 10/2002 |
| WO | 2012/017508 A1 | 2/2012 |

OTHER PUBLICATIONS

Notification of Reasons for Refusal dated Feb. 5, 2019 issued by the Japanese Patent Office in counterpart application No. 2017-537617.
Third Party Observation submitted Dec. 12, 2017 in counterpart International Application No. PCT.JP2016/069869.
Communication dated Oct. 9, 2018, from European Patent Office in counterpart application No. 16841271.6.
Notice of Third Party Observation dated Feb. 13, 2018 from the Japanese Patent Office in counterpart application No. 2017-537617.
Communication dated Jul. 9, 2019, from the European Patent Office in counterpart European Application No. 16841271.6.
International Search Report for PCT/JP2016/069869 dated Oct. 4, 2016 [PCT/ISA/210].

\* cited by examiner

[FIG. 1]

| O | X |
|---|---|
| X | O |

YARN TYPE 1/YARN TYPE 2 ARRANGEMENT
YARN TYPE 1/YARN TYPE 2 ARRANGEMENT

X CYLINDER KNIT
O DIAL KNIT

[FIG. 2]

| X | X |
|---|---|
| O | O |
| Y | ¥ |
| X | X |
| O | O |
| ¥ | Y |

YARN TYPE 1
YARN TYPE 1
YARN TYPE 2/YARN TYPE 1 ARRANGEMENT
YARN TYPE 1
YARN TYPE 1
YARN TYPE 2/YARN TYPE 1 ARRANGEMENT

X CYLINDER KNIT
O DIAL KNIT
¥ CYLINDER TUCK
Y DIAL TUCK

[FIG. 3]

|   | O |   | O |
|---|---|---|---|
| X |   | X | Y |
|   | O |   | O |
| X | Y | X |   |

YARN TYPE 1
YARN TYPE 2/YARN TYPE 1 ARRANGEMENT
YARN TYPE 1
YARN TYPE 2/YARN TYPE 1 ARRANGEMENT

X CYLINDER KNIT
O DIAL KNIT
Y DIAL TUCK

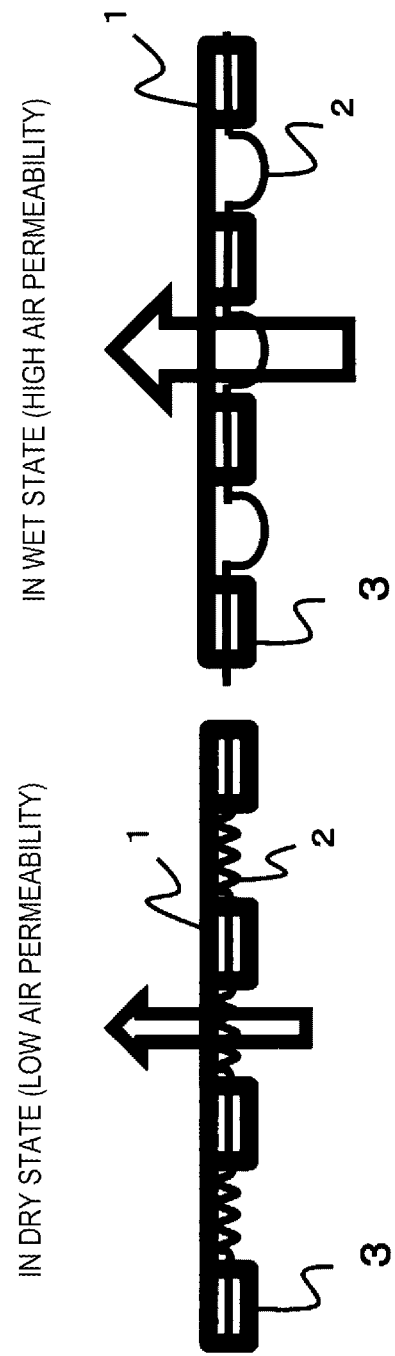

CLOTH AND FIBROUS PRODUCT

CROSS REFERENCE TO RELATED APPLICATIONS

This application is a National Stage of International Application No. PCT/JP2016/069869 filed Jul. 5, 2016 (claiming priority based on Japanese Patent Application No. 2015-171132 filed Aug. 31, 2015), the contents of which are incorporated herein by reference in their entirety.

TECHNICAL FIELD

The present invention relates to a cloth having excellent air permeability changing function due to wetness and dimensional stability and a fibrous product.

BACKGROUND ART

Conventionally, as a cloth which is improved in air permeability when being in the wet state, for example, PTL 1 has proposed a cloth using a conjugate fiber having a polyester component and a polyamide component conjugated side by side.

However, the above-mentioned cloth is not satisfactory in respect of the air permeability changing function due to wetness. Further, a problem arises in that wetness causes the cloth to change in dimension.

CITATION LIST

Patent Literature

PTL 1: JP-A-2006-97147

SUMMARY OF INVENTION

Technical Problem

The present invention has been made in view of the above background, and an object of the invention is to provide a cloth having excellent air permeability changing function due to wetness and dimensional stability and a fibrous product.

Solution to Problem

The present inventor has conducted extensive and intensive studies with a view toward achieving the above object. As a result, it has been found that, by using a conjugate fiber having two components conjugated side by side and a crimped fiber having a torque of 30 T/m or less to constitute a cloth, a cloth having excellent air permeability changing function due to wetness and dimensional stability can be obtained, and extensive and intensive studies have been further made, and thus the present invention has been completed.

According to the invention, there is provided "a cloth comprising two or more types of fibers, characterized in that the cloth contains a conjugate fiber having two components conjugated side by side and a crimped fiber having a torque of 30 T/m or less".

In the invention, it is preferred that the conjugate fiber is a conjugate fiber having a polyester component and a polyamide component conjugated side by side. Further, it is preferred that the conjugate fiber is a multifilament having a single fiber fineness of 0.8 to 3.5 dtex and a total fineness of 20 to 110 dtex. It is preferred that the crimped fiber is a composite yarn containing a false twisted crimped textured yarn having torque in the S direction and a false twisted crimped textured yarn having torque in the Z direction. It is preferred that the composite yarn is an interlaced yarn which has been subjected to interlacing. It is preferred that the composite yarn has no torque. It is preferred that the crimped fiber has a single fiber fineness of 2.3 dtex or less. It is preferred that the crimped fiber is formed from a polyester fiber.

In the cloth of the invention, it is preferred that the cloth is knitted fabric. In this case, it is preferred that the cloth has a knitted fabric density in which the course number is 40 to 100/2.54 cm and the wales number is 30 to 60/2.54 cm. It is preferred that the knitted fabric has a weft knitted fabric structure. It is preferred that the knitted fabric is multilayer-structure knitted fabric having a multilayer structure, and has loops formed from the conjugate fiber on both surfaces of the cloth. It is preferred that the conjugate fiber is contained as a bonding yarn in the knitted fabric. It is preferred that the weight ratio of the conjugate fiber and the crimped fiber is in the range of from 20:80 to 80:20. It is preferred that the cloth contains a water absorption processing agent. It is preferred that the cloth has a weight per unit in the range of from 70 to 250 g/m². It is preferred that the air permeability change ratio of the cloth in the wet state is 5% or more. It is preferred that the dimensional change ratio of the cloth in the wet state is 10% or less both in the height and width directions.

Further, according to the present invention, there is provided a fibrous product which is obtained using the above-mentioned cloth, and which is any one fibrous product selected from the group consisting of clothing, a lining cloth, an interlining cloth, socks, a stomach band, a hat, gloves, nightclothes, a side cloth for bedclothes (futon), a cover for bedclothes (futon), and a car seat skin material.

Advantageous Effects of Invention

By the present invention, there can be obtained a cloth having excellent air permeability changing function due to wetness and dimensional stability and a fibrous product.

BRIEF DESCRIPTION OF DRAWINGS

FIG. 1 A knitted fabric structure diagram used in Examples 1, 2, 4, 5, and 6.

FIG. 2 A knitted fabric structure diagram used in Example 3.

FIG. 3 A knitted fabric structure diagram which can be used in the invention.

FIG. 4 A diagram diagrammatically showing a process in which, in the invention, the cloth in the wet state is improved in air permeability.

DESCRIPTION OF EMBODIMENTS

Hereinbelow, an embodiment of the present invention will be described in detail. The invention is directed to a cloth comprising two or more types (preferably two types) of fibers, characterized in that the cloth contains a conjugate fiber having two components conjugated side by side and a crimped fiber having a torque of 30 T/m or less.

In the invention, the conjugate fiber has two components, which are conjugated side by side. It is preferred that the two components are different from each other with respect to the moisture absorption properties. Specifically, it is preferred that the two components are a polyester component and a polyamide component.

With respect to the polyester component, in view of the adhesion to the polyamide component, preferred examples include modified polyesters, such as polyethylene terephthalate, polypropylene terephthalate, and polybutylene terephthalate, each having copolymerized therewith a compound which has an alkali or alkaline earth metal of sulfonic acid or a phosphonium salt, and which has one or more functional groups having the ability to form an ester. Of these, from the viewpoint of the general-purpose properties and the cost of the polymer, modified polyethylene terephthalate having copolymerized therewith the above-mentioned compound is especially preferred. In this case, examples of the copolymerized components include sodium 5-sulfoisophthalate and ester derivatives thereof, phosphonium 5-isophthalate and ester derivatives thereof, and sodium p-hydroxybenzenesulfonate. Of these, sodium 5-sulfoisophthalate is preferred. The copolymerized component amount is preferably in the range of from 2.0 to 4.5 mol %. When the copolymerized component amount is smaller than 2.0 mol %, excellent crimp performance is obtained, but there is a possibility that removal is caused at the conjugate interface between the polyamide component and the polyester component. Conversely, when the copolymerized component amount is larger than 4.5 mol %, the crystallization of the polyester component is unlikely to proceed during the draw heat treatment, and therefore there is a need to increase the draw heat treatment temperature, causing a danger that yarn breakage frequently occurs.

On the other hand, with respect to the polyamide component, there is no particular limitation as long as it has an amide linkage in the principal chain thereof, and examples include nylon-4, nylon-6, nylon-66, nylon-46, and nylon-12. Of these, from the viewpoint of the general-purpose properties, the cost of the polymer, and the yarn-making stability, nylon-6 and nylon-66 are preferred.

The polyester component and the polyamide component may contain a known additive, for example, a pigment, a pigment, a matting agent, a stainproofing agent, a fluorescent brightener, a flame retardant, a stabilizer, an antistatic agent, a light resistance agent, an ultraviolet light absorber, or the like.

The above-mentioned conjugate fiber conjugated side by side can have an arbitrary cross-sectional form and composite form. The conjugate fiber may have a cross-sectional form of an eccentric sheath-core manner. Further, the conjugate fiber may have a triangular or rectangular cross-sectional form, or may have a hollow portion in the cross-section thereof. Especially, it is preferred that the cross-sectional form of the single fiber is circular and the fiber is of a side by side type because the air permeability is efficiently improved when being in the wet state. The ratio of the components in the composite can be arbitrarily selected, but, generally, the weight ratio of the two components is preferably in the range of from 30:70 to 70:30 (more preferably 40:60 to 60:40).

With respect to the single fiber fineness and the number of filaments (the number of single yarns) of the conjugate fiber, there is no particular limitation, but the single fiber fineness is preferably in the range of from 1 to 10 dtex (more preferably 0.8 to 3.5 dtex) and the number of filaments is preferably in the range of from 10 to 200 (more preferably 20 to 100). Especially, preferred is a multifilament (continuous fiber) having a single fiber fineness of 0.8 to 3.5 dtex and a total fineness of 20 to 110 dtex.

A conjugate fiber having different polymers conjugated side by side generally has latent crimp performance, and, as mentioned below, exhibits latent crimp performance when subjected to heat treatment in dyeing processing or the like. With respect to the crimp structure, it is preferred that the polyamide component is positioned inside the crimp and the polyester component is positioned outside the crimp. A conjugate fiber having such a crimp structure can be easily obtained by the below-described method for production. In the conjugate fiber having the above crimp structure, when being in the wet state, the polyamide component positioned inside swells and extends and the polyester component positioned outside suffers almost no change in the length, and therefore the crimp degree is reduced (the apparent length of the conjugate fiber is increased). On the other hand, when being in the dry state, the polyamide component positioned inside suffers shrinkage and the polyester component positioned outside suffers almost no change in the length, and therefore the crimp degree is increased (the apparent length of the conjugate fiber is reduced). Thus, when being in the wet state, the crimp degree of the conjugate fiber is reversibly reduced, so that the void content of the woven or knitted fabric is increased, improving the air permeability.

The conjugate fiber is preferably a non-twisted yarn or a loose twisted yarn having twisted at 300 T/m or less for facilitating lowering of crimp upon being wet to efficiently improve the air permeability. Particularly, the conjugate fiber is preferably a non-twisted yarn. When the yarn is twisted hard like a hard twisted yarn, there is a possibility that crimp is unlikely to be lowered upon being wet. The conjugate fiber may have been subjected to interlacing air processing and/or general false twist crimping processing so that the number of interlaces becomes about 20 to 100 interlaces/m (more preferably 20 to 60 interlaces/m).

The cloth of the invention contains not only the conjugate fiber but also a crimped fiber having a torque of 30 T/m or less (hereinafter, frequently referred to simply as "crimped fiber"), and therefore is improved in the air permeability changing function due to wetness and the dimensional stability.

The crimped fiber preferably has a crimp degree of 2% or more (more preferably 10 to 40%). When the crimp degree is less than 2%, there is a possibility that satisfactory soft hand or stretchability cannot be obtained.

Further, it is preferred that the crimped fiber is a composite yarn constituted by two or more types of false twisted crimped textured yarns which are different from each other in respect of the production conditions or fineness.

With respect to the false twisted crimped textured yarn, there are a so-called one heater false twisted crimped textured yarn which has false twist set in the first heater region, and a so-called second heater false twisted crimped textured yarn which has torque reduced by further introducing the above yarn into the second heater region to subject the yarn to relaxation heat treatment. Further, according to the direction of twisting, there are a false twisted crimped textured yarn having torque in the S direction and a false twisted crimped textured yarn having torque in the Z direction. In the invention, these false twisted crimped textured yarns can be used. Particularly, it is preferred that a false twisted crimped textured yarn having torque in the S direction and a false twisted crimped textured yarn having torque in the Z direction constitute a composite yarn because a composite yarn having a low torque can be obtained.

The composite yarn can be produced by, for example, the method described below. Specifically, a yarn may be passed through a first roller and a heat treatment heater at a set temperature of 90 to 220° C. (more preferably 100 to 190° C.) and twisted by means of a twisting apparatus to obtain a one heater false twisted crimped textured yarn. If necessary, the obtained yarn may be further introduced into the second heater region and subjected to relaxation heat treatment to obtain a second heater false twisted crimped textured yarn. The draw ratio in the false twisting is preferably in the range of from 0.8 to 1.5, and, with respect to the number of false twists, in the formula: the number of false twists $(T/m)=(32,500/(Dtex)^{1/2})\times\alpha$, $\alpha$ is preferably 0.5 to 1.5, generally about 0.8 to 1.2. The Dtex means a total fineness of the yarn. With respect to the twisting apparatus used, a frictional twisting apparatus of a disc type or a belt type is appropriate because it is easy to set a yarn and a yarn breakage is unlikely to occur, but a twisting apparatus of a pin type may be used. Further, according to the direction of twisting, the direction of the torque of the false twisted crimped textured yarn can be selected from the S direction and the Z direction. Then, two or more types of false twisted crimped textured yarns are doubled, obtaining the composite yarn.

It is preferred that the composite yarn has interlaces imparted by interlacing. The number of interlaces is preferably in the range of from 30 to 90 interlaces/m for preventing the soft hand or stretchability from deteriorating. When the number of interlaces is larger than 90 interlaces/m, there is a possibility that soft hand or stretchability deteriorates. Conversely, when the number of interlaces is smaller than 30 interlaces/m, there is a possibility that the binding properties for the composite yarn are unsatisfactory, so that the knitting or weaving properties deteriorate. The interlace treatment (interlacing) may be a treatment using a general interlacing nozzle.

It is important that the obtained composite yarn has a torque of 30 T/m or less (preferably 18 T/m or less, more preferably 10 T/m or less, especially preferably zero (0 T/m)). The torque is preferably smaller, and zero torque (0 T/m) is most preferred. For achieving zero torque, when the false twisted crimped textured yarn having torque in the S direction and the false twisted crimped textured yarn in the Z direction are doubled, two types of false twisted crimped textured yarns having substantially the same torque except that the direction of the torque is different from that of the other are advantageously used.

The composite yarn (crimped fiber) preferably has a single fiber fineness of 2.3 dtex or less (preferably 0.00002 to 2.0 dtex, especially preferably 0.1 to 2.0 dtex). The single fiber fineness is preferably smaller, and the fiber may be one having a single fiber diameter of 1,000 nm or less called a nanofiber. When the single fiber fineness is larger than 2.3 dtex, there is a possibility that the water absorption properties become poor, so that the air permeability change ratio of the cloth in the wet state is lowered. It is preferred that the single fiber fineness of the composite yarn is smaller than the single fiber fineness of the conjugate fiber. The total fineness of the composite yarn is preferably in the range of from 33 to 220 dtex. Further, the number of filaments of the composite yarn is preferably in the range of from 50 to 300 (more preferably 100 to 300).

Further, the single fiber cross-sectional form of the composite yarn (crimped fiber) may be a general circular cross-section, but may be an irregular-shape cross-sectional form other than the circular cross-section. Examples of the irregular-shape cross-sectional forms include a triangle, a rectangle, a cross shape, a flattened shape, a flattened shape with a shoulder, an H-shape, and a W-shape. In the flattened cross-sectional form, a cross-sectional flatness represented by ratio B/C1 is preferably in the range of from 2 to 6 (more preferably 3.1 to 5.0) from the viewpoint of the softness of the cloth, wherein B/C1 is a ratio of a length B in the direction of the longitudinal center line to a maximum width C1 in the direction perpendicular to the direction of the longitudinal center line. Further, ratio C1/C2 of the maximum value C1 to a minimum value C2 of the width is preferably in the range of from 1.05 to 4.00 (more preferably 1.1 to 1.5) from the viewpoint of the water absorption properties of the cloth.

With respect to the fiber constituting the composite yarn (crimped fiber), there is no particular limitation, and a polyester fiber, an acrylic fiber, a nylon fiber, a rayon fiber, an acetate fiber, or a natural fiber, such as cotton, wool, or silk, or a composite thereof can be used. Especially a polyester fiber is preferred. With respect to the polyester, preferred is a polyester having terephthalic acid as a main acid component, and having as a main glycol component an alkylene glycol having 2 to 6 carbon atoms, specifically, at least one member selected from the group consisting of ethylene glycol, trimethylene glycol, tetramethylene glycol, pentamethylene glycol, and hexamethylene glycol. Of these, especially preferred is a polyester having ethylene glycol as a main glycol component (polyethylene terephthalate) or a polyester having trimethylene glycol as a main glycol component (polytrimethylene terephthalate).

The polyester may have a copolymerized component in a small amount (generally 30 mol % or less) if necessary. As examples of difunctional carboxylic acids other than terephthalic acid used in the polyester, there can be mentioned aromatic, aliphatic, or alicyclic difunctional carboxylic acids, such as isophthalic acid, naphthalenedicarboxylic acid, diphenyldicarboxylic acid, diphenoxyethanedicarboxylic acid, β-hydroxyethoxybenzoic acid, P-oxybenzoic acid, sodium 5-sulfoisophthalate, adipic acid, sebacic acid, and 1,4-cyclohexanedicarboxylic acid. As examples of diol compounds other than the above-mentioned glycol, there can be mentioned aliphatic, alicyclic, or aromatic diol compounds and polyoxyalkylene glycol, such as cyclohexane-1,4-dimethanol, neopentyl glycol, bisphenol A, and bisphenol S.

The polyester may be one which is synthesized by an arbitrary method. For example, explanation is made below on polyethylene terephthalate. Polyethylene terephthalate may be one that is produced through a first stage reaction in which terephthalic acid and ethylene glycol are directly subjected to esterification reaction, or a lower alkyl ester of terephthalic acid, such as dimethyl terephthalate, and ethylene glycol are subjected to transesterification reaction, or terephthalic acid and ethylene oxide are reacted to form a glycol ester of terephthalic acid and/or a low polymer thereof, and a second stage reaction in which the reaction product obtained in the first stage is heated under a reduced pressure to cause a polycondensation reaction until a desired degree of polymerization is achieved. Alternatively, the polyester may be a polyester obtained by material recycle or chemical recycle, or, as described in JP-A-2004-270097 and JP-A-2004-211268, a polyester obtained using a catalyst containing a specific phosphorus compound and titanium compound. Further alternatively, the polyester may be a polyester having biodegradability, such as polylactic acid or stereocomplex polylactic acid.

It is preferred that the polyester contains an ultraviolet light absorber in an amount of 0.1% by weight or more (preferably 0.1 to 5.0% by weight), based on the weight of the polyester, because ultraviolet light screening properties are imparted to the cloth. Examples of such ultraviolet light absorbers include a benzoxazine organic ultraviolet light absorber, a benzophenone organic ultraviolet light absorber, a benzotriazole organic ultraviolet light absorber, and a salicylic acid organic ultraviolet light absorber. Of these, a benzoxazine organic ultraviolet light absorber is especially preferred because it is not decomposed on the stage of spinning.

As a preferred example of the benzoxazine organic ultraviolet light absorber, there can be mentioned one disclosed in JP-A-62-11744. Specifically, there can be mentioned 2-methyl-3,1-benzoxazin-4-one, 2-butyl-3,1-benzoxazin-4-one, 2-phenyl-3,1-benzoxazin-4-one, 2,2'-ethylenebis(3,1-benzoxazin-4-one), 2,2'-tetramethylenebis(3,1-benzoxazin-4-one), 2,2'-p-phenylenebis(3,1-benzoxazin-4-one), 1,3,5-tri(3,1-benzoxazin-4-on-2-yl)benzene, and 1,3,5-tri(3,1-benzoxazin-4-on-2-yl)naphthalene.

The polyester preferably contains a matting agent (titanium dioxide) in an amount of 0.2% by weight or more (preferably 0.3 to 2.0% by weight), based on the weight of the polyester, because transparency preventive properties are imparted to the cloth.

Further, if necessary, the polyester may contain one or more members of a micropore forming agent (organic sulfonic acid metal salt), a color protection agent, a thermal stabilizer, a flame retardant (diantimony trioxide), a fluorescent brightener, a coloring pigment, an antistatic agent (sulfonic acid metal salt), a moisture absorbing agent (polyoxyalkylene glycol), an anti-fungus agent, and other inorganic particles.

In the cloth of the invention, the structure of the cloth is not particularly limited, and may be any of knitted fabric, woven fabric, and nonwoven fabric. Preferred examples of fabric include woven fabric having a weave structure, such as plain weave, twill weave, or satin; knitted fabric having a knit structure, such as sheeting, interlock stitch, circular rib stitch; and nonwoven fabric, but the fabric is not limited to these. With respect to the number of layers, the cloth may be either of a single layer or of a multilayer having two or more layers. Especially, knitted fabric is preferred. Particularly, knitted fabric having a weft knitted (circular knitted) fabric structure is preferred. Among the weft knitted (circular knitted) fabric structures, especially preferred is an interlock stitch structure. Further, it is preferred that the conjugate fiber is contained as a bonding yarn in the knitted fabric.

In this case, the conjugate fiber and the crimped fiber may be contained in the cloth in the form of a composite yarn, such as an air combined filament yarn, but it is preferred that these fibers are interlaced for achieving both excellent air permeability changing function and dimensional stability upon being in the wet state. Particularly, it is preferred that the cloth is multilayer-structure knitted fabric having a multilayer structure, and has loops formed from the conjugate fiber on both surfaces of the cloth.

Further, the weight ratio of the conjugate fiber and the crimped fiber is preferably in the range of from 20:80 to 80:20. The (conjugate fiber:crimped fiber) ratio is especially preferably 25:75 to 50:50. With respect to the total fineness ratio, the (conjugate fiber:crimped fiber) ratio is preferably 1:0.6 to 1:5. The cloth of the invention is preferably constituted only from the conjugate fiber and the crimped fiber, but may further contain another fiber (for example, non-crimped polyester multifilament or the like).

In the cloth of the invention, it is preferred that the cloth has a weight per unit of 250 g/m² or less (preferably 70 to 250 g/m²). When the weight per unit is larger than 250 g/m², there is a possibility that the weight of the cloth is so large that the wearing comfortability becomes poor, or the movability (crimp change) of the conjugate fiber in the cloth becomes poor.

The cloth of the invention can be produced by, for example, the method described below. First, using a polyester and a polyamide, melt conjugate fiber spinning is performed to form a yarn of a side by side type. In this case, a modified polyester having an intrinsic viscosity of 0.30 to 0.43 (as measured using orthochlorophenol as a solvent at 35° C.) and having sodium 5-sulfoisophthalate copolymerized in an amount of 2.0 to 4.5 mol % and a polyamide having an intrinsic viscosity of 1.0 to 1.4 (as measured using m-cresol as a solvent at 30° C.) are preferably used. When the intrinsic viscosity of the polyester component is larger than 0.43, the polyester component is increased in viscosity, and therefore there is a possibility that the physical properties of the resultant conjugate fiber are close to those of a fiber formed only from the polyester component, so that a cloth aimed at by the invention cannot be obtained. Conversely, when the intrinsic viscosity of the polyester component is smaller than 0.30, there is a possibility that the melt viscosity is so small that the yarn-making properties become poor and further fluffing frequently occurs, thus lowering the quality and productivity.

With respect to the spinning nozzle used in the melt spinning, preferred is a spinning nozzle in which, as shown in FIG. 1 of JP-A-2000-144518, the discharge pores on the high viscosity side and on the low viscosity side are separated and the discharge linear speed on the high viscosity side is reduced (the cross-sectional area for discharge is increased). It is preferred that molten polyester is passed through the discharge pore on the high viscosity side and molten polyamide is passed through the discharge pore on the low viscosity side, followed by cooling and solidification. In this case, the weight ratio of the polyester component and the polyamide component is, as mentioned above, preferably in the range of from 30:70 to 70:30 (more preferably 40:60 to 60:40).

A separate draw system may be employed in which after the melt conjugate fiber spinning, the yarn is once wound up and then drawn, and a direct draw system may be employed in which the yarn is not wound up and is subjected to draw heat treatment. In this case, the spinning and drawing conditions may be general conditions. For example, in the case of the direct draw system, spinning at about 1,000 to 3,500 m/minute is conducted, and then the yarn is successively drawn at a temperature of 100 to 150° C. and wound up. The draw ratio may be appropriately selected so that the finally obtained conjugate fiber has an elongation at break of 10 to 60% (preferably 20 to 45%) and a strength at break of about 3.0 to 4.7 cN/dtex.

Then, using the above conjugate fiber and the crimped fiber having a torque of 30 T/m or less, a cloth is woven or knitted and then, subjected to heat treatment, such as dyeing processing, to cause crimp of the conjugate fiber.

In this case, the temperature of the dyeing processing is preferably 100 to 140° C. (more preferably 110 to 135° C.), and, with respect to the time, the keeping time for the highest temperature is preferably in the range of from 5 to 40 minutes. By subjecting the woven or knitted fabric to dyeing processing under such conditions, the conjugate fiber has crimp caused due to a thermal shrinkage difference between the polyester component and the polyamide component. In this case, by selecting the above-mentioned polymers as the polyester component and the polyamide component, there is obtained a crimp structure in which the polyamide component is positioned inside the crimp.

The cloth which has been subjected to dyeing processing is preferably subjected to dry heat final setting. In this case, the temperature of the dry heat final setting is preferably 120 to 200° C. (more preferably 140 to 180° C.), and the time for the dry heat final setting is preferably in the range of from 1 to 3 minutes. When the temperature of the dry heat final setting is lower than 120° C., there is a possibility that wrinkles generated during the dyeing processing are likely to remain as such, and the finished product is poor in dimensional stability. Conversely, when the temperature of the dry heat final setting is higher than 200° C., there is a possibility that the crimp of the conjugate fiber caused during the dyeing processing is lowered, or the fiber is hardened to cause hand of the fabric to become hard.

Further, it is preferred that the cloth of the invention has been subjected to water absorption processing. When the cloth is subjected to water absorption processing, it is likely that the air permeability is improved even due to a small amount of sweat. The water absorption processing may be general water absorption processing, and, as a preferred example of such processing, there can be mentioned one in which a water absorption processing agent, such as polyethylene glycol diacrylate or a derivative thereof, or a polyethylene terephthalate-polyethylene glycol copolymer, is deposited onto the cloth in an amount of 0.25 to 0.50% by weight, based on the weight of the cloth. As examples of methods for water absorption processing, there can be mentioned a method of processing in a bath in which a water absorption processing agent is mixed into a dyeing liquid at the time of dyeing processing, a method in which, before being subjected to dry heat final setting, the cloth is dipped in a water absorption processing liquid and squeezed using a mangle, and methods of processing by coating, such as a gravure coating method and a screen printing method.

In the thus obtained cloth, the crimp degree of the conjugate fiber contained in the cloth is efficiently reduced when being in the wet state, and therefore the yarn length of the conjugate fiber is increased, so that, as diagrammatically shown in FIG. 4, voids in the cloth become large to improve the air permeability. On the other hand, the crimp degree of the conjugate fiber is increased when being in the dry state, and therefore the yarn length of the conjugate fiber is reduced, so that voids in the cloth become small to cause the air permeability to be poor. In this instance, the crimped fiber having a torque of 30 T/m contained in the cloth improves the cloth in bulkiness, so that the water absorption properties are enhanced, obtaining excellent air permeability changing function. Further, simultaneously, excellent dimensional stability is obtained.

It is preferred that the air permeability change ratio is 5% or more (preferably 80 to 500%). The air permeability is a value (c.f.m.) measured in accordance with JIS L 1096-2010, 8.26.1, A method (Frajour type method) (in which the pressure for measurement is changed from 125 Pa described in JIS to 20 Pa). The air permeability change ratio is represented by the following formula.

Air permeability change ratio (%)=(((Air permeability in the wet state)−(Air permeability in the dry state))/(Air permeability in the dry state))×100

The dry state means the state obtained after a sample has been allowed to stand in an environment at a temperature of 20° C. and at a humidity of 65% RH for 24 hours. On the other hand, the wet state means the state obtained after a sample which uniformly contains water in an amount of 50% by weight, based on the weight of the fabric, has been allowed to stand for one minute. Air permeability values (n=5) of the individual samples in each state are measured, and an average of the measured values is determined.

When the air permeability change ratio is smaller than 5%, there is a possibility that a problem is likely to occur in that a person feels sticky upon sweating. It is preferred that, after washing is conducted once in accordance with JIS L0217-1995, 103 method, the air permeability change ratio is 10% or more.

Further, it is preferred that the dimensional change ratio of the cloth is 10% or less both in the height and width directions. The dimensional change ratio of the cloth is represented by the following formula.

Dimensional change ratio of the cloth (%)=(((Dimension in the wet state)−(Dimension in the dry state))/(Dimension in the dry state))×100

The dry state means the state obtained after a sample having a dimension of (height: 20 cm×width: 2.5 cm=50 cm²) has been allowed to stand in an environment at a temperature of 20° C. and at a humidity of 65% RH for 24 hours. Five samples are prepared respectively for the height and width directions and are individually measured. On the other hand, the wet state means the state obtained after a sample has been suspended in the lengthwise direction for 5 minutes immediately after immersed in water at a temperature of 20° C. for 10 minutes. Cloth dimension values (the number of samples=5) of the individual samples in each state are measured, and an average of the measured values is determined.

When the dimensional change ratio of the cloth is larger than 10%, there is a possibility that a fibrous product obtained using the cloth is poor in wearing comfortability or appearance. It is preferred that, after washing is conducted once in accordance with JIS L0217-1995, 103 method, the dimensional change ratio of the cloth is 10% or less both in the height and width directions.

In the cloth of the invention, in addition to the above-mentioned processing, raising processing by a general method, or various types of processing for imparting a function using an ultraviolet light screening agent, an anti-fungus agent, a deodorant, a mothproofing agent, a phosphorescent agent, a retroreflective agent, a negative ion generator, a water repellent, or the like may be applied.

Further, according to the invention, there is provided a fibrous product which is obtained using the above-mentioned cloth, and which is any one fibrous product selected from the group consisting of clothing, a lining cloth, an interlining cloth, socks, a stomach band, a hat, gloves, nightclothes, a side cloth for bedclothes (futon), a cover for bedclothes (futon), and a car seat skin material. The fibrous product uses the above-mentioned cloth, and therefore has excellent air permeability changing function and dimensional stability when being in the wet state.

EXAMPLES

Hereinbelow, the present invention will be described in more detail with reference to the following Examples, which should not be construed as limiting the scope of the invention. In the following Examples, the physical properties were measured in accordance with the methods described below.

(1) Intrinsic Viscosity of Polyester

An intrinsic viscosity is measured using orthochlorophenol as a solvent at a temperature of 35° C.

(2) Intrinsic Viscosity of Polyamide

An intrinsic viscosity is measured using m-cresol as a solvent at a temperature of 30° C.

(3) Strength at Break and Elongation at Break

A fiber sample is allowed to stand overnight in a room kept constantly at an atmosphere temperature of 25° C. and a humidity of 60% RH, and then set with a sample length of 100 mm in a tensile tester Tensilon, manufactured by Shimadzu Corporation, and stretched at a speed of 200 mm/min to measure a strength (cN/dtex) and an elongation (%) at break. n is 5 and respective averages of the measured values are determined.

(4) Torque

An about 70 cm sample (crimped yarn) is stretched horizontally, and an initial load of 0.18 mN×indicated tex (2 mg/de) is suspended from the center portion of the sample, and then the both ends are pulled to straighten the yarn.

The yarn starts rotating due to the residual torque, and is left in that state until the initial load is still, obtaining a twisted yarn. With respect to the obtained twisted yarn, the number of twists with a length of 25 cm under a load of 17.64 mN×indicated tex (0.2 g/de) is measured by a twist detector. The obtained number of twists (T/25 cm) is quadrupled and the resultant value is used as a torque (T/m).

(5) Interlace Degree

An interlaced yarn with a length of 1 m under a load of 8.82 mN×indicated tex (0.1 g/de) is taken, and the load is removed, and, after release at room temperature for 24 hours, the number of knots is read and indicated in the number of knots/m.

(6) Crimp Degree

A yarn to be tested is wound round a counter wheel having a circumferential length of 1.125 m to prepare a hank having a dry fineness of 3,333 dtex. The hank is suspended from a suspender nail of a scale plate, and an initial load of 6 g is applied to the lower portion of the hank, and a load of 600 g is further applied and a length L0 of the hank at that time is measured. Immediately after that, the load is removed from the hank and the hank is taken out from the suspender nail of the scale plate, and the hank is immersed in boiling water for 30 minutes to cause crimp. The hank which has been subjected to boiling water treatment is taken out from the boiling water, and water contained in the hank is removed by allowing filter paper to absorb the water, and the hank is air-dried at room temperature for 24 hours. The air-dried hank is suspended from a suspender nail of a scale plate, and a load of 600 g is applied to the lower portion of the hank, and, after one minute, a length L1a of the hank is measured, and then the load is removed from the hank, and, after one minute, a length L2a of the hank is measured. A crimp degree (CP) of the filament yarn to be tested is calculated from the following formula.

$$CP\ (\%)=((L1a|L2a)/L0)\times 100$$

(7) Matting Agent Content

A matting agent content is calculated from the following formula.

Matting agent content (%)=(Mass (gr) of the matting agent added/Mass (gr) of the polymer before adding the matting agent)×100

(8) Washing and Drying

Washing is conducted once in accordance with JIS L0217-1995, 103 method.

Drying is conducted in accordance with JIS L1096-2010, 8.24.1, A1 method—2.3 tumbler.

(9) Air Permeability

The air permeability is a value (c.f.m.) measured in accordance with JIS L 1096-2010, 8.26.1, A method (Frajour type method) (in which the pressure for measurement is changed from 125 Pa described in JIS to 20 Pa). The dry state means the state obtained after a sample has been allowed to stand in an environment at a temperature of 20° C. and at a humidity of 65% RH for 24 hours. On the other hand, the wet state means the state obtained after a sample which uniformly contains water in an amount of 50% by weight, based on the weight of the fabric, has been allowed to stand for one minute. Air permeability values (the number of samples=5) of the individual samples in each state are measured, and an average of the measured values is determined. Then, an air permeability change ratio is calculated from the following formula.

Air permeability change ratio (%)=(((Air permeability in the wet state)−(Air permeability in the dry state))/(Air permeability in the dry state))×100

(10) Dimensional Change Ratio

A height (width) dimension in the dry state and a height (width) dimension in the wet state are measured.

The dry state means the state obtained after a sample having a dimension of (height: 20 cm×width: 2.5 cm=50 cm2) has been allowed to stand in an environment at a temperature of 20° C. and at a humidity of 65% RH for 24 hours. Five samples are prepared respectively for the height and width directions and are individually measured. On the other hand, the wet state means the state obtained after a sample has been suspended in the lengthwise direction for 5 minutes immediately after immersed in water at a temperature of 20° C. for 10 minutes. Cloth dimension values (the number of samples=5) of the individual samples in each state are measured, and an average of the measured values is determined. Then, a cloth dimensional change ratio is calculated from the following formula.

Dimensional change ratio of the cloth (%)=(((Dimension in the wet state)−(Dimension in the dry state))/(Dimension in the dry state))×100

(11) Dimensional Change Ratio Between Before and after Washing

A height (width) dimension before the washing and a height (width) dimension after the washing are measured. Then, a dimensional change ratio of the cloth is calculated from the following formula.

Dimensional change ratio (%)=((Dimension before washing)−(Dimension after washing))/(Dimension before washing)×100

(12) Weight Per Unit

A weight per unit is measured in accordance with JIS L1018-1998 6.4.

Example 1

Using polyethylene terephthalate (matting agent content: 0.3% by weight), a yarn was melt spun at 280° C. from a general spinning apparatus, and taken at a speed of 2,800 m/minute and wound without drawing to obtain a semi-drawn polyester yarn (total fineness: 145 dtex/72 fil; cross-sectional form of the single fiber: circular cross-section).

Then, using the obtained polyester yarn, co-draw false twist crimping was performed under conditions such that the draw ratio was 1.6 times, the number of false twists was 2,500 T/m (S direction), the heater temperature was 180° C., and the yarn speed was 350 m/minute.

Meanwhile, using the above polyester yarn, co-draw false twist crimping was performed under conditions such that the draw ratio was 1.6 times, the number of false twists was 2,500 T/m (Z direction), the heater temperature was 180° C., and the yarn speed was 350 m/minute.

Then, the false twisted crimped textured yarn having torque in the S direction and the false twisted crimped textured yarn having torque in the Z direction were doubled and subjected to air interlace treatment to obtain a composite yarn (total fineness: 167 dtex/144 fil; crimp degree: 12%; torque: 0 T/m), which is referred to as "yarn type 1". In this instance, the air interlace treatment was interlacing using an interlacing nozzle, in which 50 interlaces/m were imparted with an overfeeding ratio of 1.0% at a compressed air pressure of 0.3 MPa (3 kgf/cm$^2$).

On the other hand, nylon 6 having an intrinsic viscosity [η] of 1.3 and modified polyethylene terephthalate, which is obtained by copolymerizing with 2.6 mol % sodium 5-sulfoisophthalate having an intrinsic viscosity [η] of 0.39, were melted individually at 270° C. and 290° C., and extruded individually at a discharge amount of 12.7 g/minute using a conjugate fiber spinning nozzle similar to that shown in FIG. 1 of JP-A-2000-144518 to form a conjugate fiber having a side-by-side type single yarn cross-sectional form, and the yarn was cooled and solidified and an oil agent was added thereto. Then, the resultant yarn was preheated by a preheating roller at a speed of 1,000 m/minute and at a temperature of 60° C., and subsequently subjected to draw heat treatment between the preheating roller and a heating roller heated to a temperature of 150° C. and at a speed of 3,050 m/minute, and wound to obtain a conjugate fiber (multifilament) having a total fineness of 84 dtex/24 fil, which is referred to as "yarn type 2". The obtained conjugate fiber had a strength at break of 3.4 cN/dtex and an elongation at break of 40%.

Then, using a 24-gauge double circular knitting machine, and using the above-obtained conjugate fiber (which has not been subjected to boiling water treatment, and which has no crimp caused; non-twisted yarn) as a bonding yarn, knitting of a circular knitted fabric having an interlock stitch structure (shown in FIG. 1) was conducted.

Then, the circular knitted fabric was subjected to dyeing processing at a temperature of 130° C. for a keeping time of 15 minutes, causing the latent crimp performance of the conjugate fiber to be exhibited. In this instance, a water absorption processing agent (polyethylene terephthalate-polyethylene glycol copolymer) was added to the dyeing liquid in an amount of 2 ml/l and the knitted fabric was treated using the same bath upon the dyeing processing, so that the water absorption processing agent was applied to the knitted fabric. Then, the circular knitted fabric was subjected to dry heat final setting at a temperature of 160° C. for a time of one minute.

The obtained knitted fabric had excellent air permeability changing function due to wetness and dimensional stability. The density, weight per unit, and evaluation results are shown in Table 1.

Further, clothing was obtained using the knitted fabric and a person worn the clothing, and, as a result, the clothing was found to have excellent air permeability changing function due to wetness and dimensional stability.

Examples 2 to 4

Procedure was performed in substantially the same manner as in Example 1 except that the gauge number of the double circular knitting machine used, the knitted fabric structure, the total fineness/the number of filaments of the yarn type 1, and the total fineness/the number of filaments of the yarn type 2 were changed to those shown in Table 1. The torque of each yarn type 2 is 0 T/m. The obtained knitted fabric had excellent air permeability changing function due to wetness and dimensional stability. The density, weight per unit, and evaluation results are shown in Table 1.

Example 5

Procedure was performed in substantially the same manner as in Example 1 except that a false twisted crimped textured yarn (total fineness: 167 dtex/144 fil; crimp degree: 10%; torque: 20 T/m) formed using a single yarn as the yarn type 1 was used.

With respect to the obtained knitted fabric, the density, weight per unit, and evaluation results are shown in Table 1.

Example 6

Procedure was performed in substantially the same manner as in Example 1 except that a 28-gauge double circular knitting machine was used, and that a false twisted crimped textured yarn (total fineness: 110 dtex/144 fil; crimp degree: 15%; torque: 15 T/m) formed using a single yarn as the yarn type 1 was used.

With respect to the obtained knitted fabric, the density, weight per unit, and evaluation results are shown in Table 1.

TABLE 1

|  |  | Example 1 | Example 2 | Example 3 | Example 4 | Example 5 | Example 6 |
|---|---|---|---|---|---|---|---|
| Knitting design | Gauge | 24 G | 28 G | 28 G | 36 G | 24 G | 28 G |
|  | Structure | Interlock | Interlock | Both-side knot structure | Interlock | Interlock | Interlock |
| Yarn type | Yarn type 1 | Composite yarn SD167T144 | Composite yarn SD110T144 | Composite yarn SD66T72 | Composite yarn SD44T48 | Single yarn SD167T144 | Single yarn SD110T144 |
|  | Yarn type 2 (Zero-torque) | SD84T24 | SD84T24 | SD56T24 | SD33T24 | SD84T24 | SD84T24 |
| Knitted fabric | Knitted fabric density (C/W) | 40/40 | 52/45 | 48/42 | 65/50 | 40/39 | 52/44 |
|  | Weight per unit (g/m2) | 200 | 140 | 135 | 90 | 200 | 140 |
| Before washing | Air permeability (DRY) | 55 | 60 | 75 | 38 | 62 | 65 |
|  | Air permeability (WET) | 63.3 | 68.4 | 84 | 41 | 70 | 72 |
|  | Air permeability change ratio (%) | 15.1 | 14 | 12 | 7.9 | 12.9 | 10.8 |

TABLE 1-continued

|  |  | Example 1 | Example 2 | Example 3 | Example 4 | Example 5 | Example 6 |
| --- | --- | --- | --- | --- | --- | --- | --- |
| After washing | Air permeability (DRY) | 45 | 50 | 62 | 28 | 50 | 48 |
|  | Air permeability (WET) | 57 | 66 | 82 | 39 | 61 | 61 |
|  | Air permeability change ratio (%) | 26.7 | 32.0 | 32.3 | 39.3 | 22.0 | 27.1 |
| Dimensional change ratio in wet state (%) (Height * width) | Before washing | 3.2 * 1.2 | 3.5 * 1.5 | 2.2 * 0.8 | 2.5 * 1.5 | 5.5 * 3.5 | 5 * 5.5 |
|  | After washing | 5.0 * 3.5 | 4.5 * 2.0 | 3.5 * 3.0 | 4.5 * 4 | 7.5 * 3.5 | 8 * 5.5 |
| Washing dimensional change ratio (%) (Height * width) |  | 3.5 * 2.5 | 3.2 * 1.5 | 4.0 * 2.5 | 3.5 * 1.5 | 6.2 * 5.5 | 5.8 * 5.2 |
| Weight ratio (Yarn type 1:Yarn type 2) |  | 20:80 | 27:73 | 30:70 | 40:60 | 20:80 | 27:73 |

INDUSTRIAL APPLICABILITY

By the present invention, there are provided a cloth having excellent air permeability changing function due to wetness and dimensional stability and a fibrous product, and they are of extremely great commercial significance.

REFERENCE SIGNS LIST

1: Crimped fiber having a torque of 30 T/m or less
2: Conjugate fiber having two components conjugated side by side
3: Site at which the cloth is bound with a crimped fiber having a torque of 30 T/m or less

The invention claimed is:

1. A cloth comprising two or more types of yarns, characterized in that the cloth contains a conjugate yarn having two components conjugated side by side and a crimped yarn having a torque of 30 T/m or less,
and the conjugate yarn is a conjugate yarn having a polyester component and a polyamide component conjugated side by side, and the crimped yarn is a composite yarn containing a false twisted crimped textured yarn having torque in the S direction and a false twisted crimped textured yarn having torque in the Z direction,
and the cloth is knitted fabric which is knitted using the conjugate yarn and the crimped yarn,
and the air permeability change ratio of the cloth in the wet state is 5% or more, and the dimensional change ratio of the cloth in the wet state is 10% or less in the height and width directions.

2. The cloth according to claim 1, wherein the conjugate yarn is a multifilament having a single fiber fineness of 0.8 to 3.5 dtex and a total fineness of 20 to 110 dtex.

3. The cloth according to claim 1, wherein the composite yarn is an interlaced yarn which has been subjected to interlacing.

4. The cloth according to claim 1, wherein the composite yarn has no torque.

5. The cloth according to claim 1, wherein the crimped yarn has a single fiber fineness of 2.3 dtex or less.

6. The cloth according to claim 1, wherein the crimped yarn is formed from a polyester fiber.

7. The cloth according to claim 1, which has a knitted fabric density in which the course number is 40 to 100/2.54 cm and the wales number is 30 to 60/2.54 cm.

8. The cloth according to claim 1, wherein the knitted fabric has a weft knitted fabric structure.

9. The cloth according to claim 1, wherein the weight ratio of the conjugate yarn and the crimped yarn is in the range of from 20:80 to 80:20.

10. The cloth according to claim 1, wherein the cloth contains a water absorption processing agent.

11. The cloth according to claim 1, wherein the cloth has a weight per unit in the range of from 70 to 250 g/m$^2$.

12. A fibrous product obtained using the cloth according to claim 1, which is any one fibrous product selected from the group consisting of clothing, a lining cloth, an interlining cloth, socks, a stomach band, a hat, gloves, nightclothes, a side cloth for bedclothes (futon), a cover for bedclothes (futon), and a car seat skin material.

13. The cloth according to claim 3, wherein the conjugate yarn is a multifilament having a single fiber fineness of 0.8 to 3.5 dtex and a total fineness of 20 to 110 dtex.

14. The cloth according to claim 1, wherein the conjugate fiber is contained as a bonding yarn in the knitted fabric.

* * * * *